March 15, 1955     R. ALKAN     2,704,353

VARIABLE INDUCTOR

Filed Aug. 16, 1951

Robert Alkan
Inventor
By Wilkinson & Mawhinney
Attys.

United States Patent Office 2,704,353
Patented Mar. 15, 1955

2,704,353

VARIABLE INDUCTOR

Robert Alkan, Paris, France, assignor to Societe Francaise d'Equipements pour la Navigation Aerienne S. F. E. N. A., Seine, France, a joint-stock company of France Application August 16, 1951, Serial No. 242,134

Claims priority, application France April 30, 1951

5 Claims. (Cl. 336—79)

This invention relates to improvements in electrical systems for the transmission of angular displacements to a remote point, especially to such systems as used for controlling, in accordance with the indications of a master transmitter, apparatus having a very low driving torque. One or more repeater devices repeat with great accuracy the angular displacements of the transmitter, in which said displacements may attain and exceed 360° without substantially disturbing the transmitter.

An object of the invention is to provide an improved remote control and indicating system of the type described in which the construction is simplified, while its sensitivity and precision are high. Another object is to provide a system in which the mass and hence the inertia of the sensitive element attached to the moving structure of the measuring instrument or transmitter is reduced to a minimum. A further object is to provide a system in which the opposing torque applied to said moving structure of the transmitter is reduced to a negligibly low value, and all disturbances are substantially eliminated even where the invention is applied to apparatus having a very low directional or driving torque, as in magnetic compasses. Another object is to increase the sensitivity of remote control and indicating systems while avoiding the necessity of supplying current to the movable elements therein and thus eliminating the presence of any frictional contacts in the transmitter. A still further object is to provide such a system wherein the electrical windings of the transmitter may be arranged externally of the binnacle containing the movable structure for instance, in the case of immersed compasses, and thus facilitate assembly, adjustment, maintenance and wiring operations.

According to this invention, a remote control and indicating system is provided which essentially comprises a transmitter consisting of a casing having a shaft journalled therein. The shaft has secured thereon the movable structure of the transmitter as well as a small inclined disc made of a thin sheet of magnetically permeable metal. An annular, torically wound stator surrounds the disc in a plane normal to said shaft and a detector coil is disposed coaxially with, and in the space defined between, the disc and stator. The arrangement is such that a diametrically directed alternating field will be created in a plane normal to the axis of the movable structure of the transmitter under the action of a receiver comprising a stator similar to and connected with the transmitter stator, and a rotor consisting of a movable inductor winding. The direction of the field is controllable from a remote point by the angular displacement of the receiver rotor, and deflection of the field by the inclined disc being used in order to create within the detector or pick-up coil of the transmitter an alternating signal. The signal after suitable amplification, may be applied to energize a follow-up motor adapted to drive the receiver rotor, as well as an indicator pointer, to positions corresponding with that of said inclined disc.

The invention further comprises instruments of the general type above described, which incorporate the above-specified provisions, as well as fixed or movable installations incorporating such instruments.

The ensuing detailed description and the accompanying drawings will particularize both the characteristic features and the operation of the device forming the subject matter of this invention.

Figure 1:
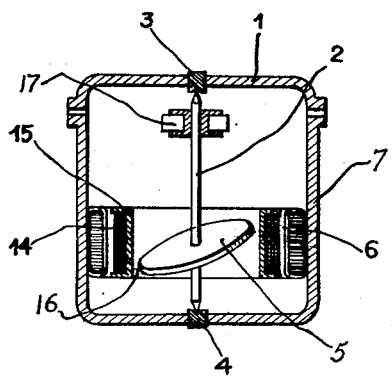
Fig. 1 illustrates in diagrammatic cross-sectional elevation an improved transmitter device according to the invention as applied to a magnetic compass.

As illustrated in Figs. 1 to 4, a casing 1 has mounted in it a shaft 2 journalled in two bearings 3, 4. The shaft extends through the centre of and supports a flat inclined disc made of thin soft iron sheeting 5. This disc, which alone constitutes the transmitter rotor, provides a very light-weight rotor which is very simple to manufacture. The rotor is preferably secured on a shaft coaxial with movable structure of the measuring apparatus. In Fig. 1, the rotor disc is rigidly secured to the vertical axis of a magnetic compass which supports the magnets 17. In order to reduce the height of the instrument, the compass magnets 17 may be brought as close to the inclined disc 5 as consistent with the condition that the magnetic reaction of the single-phase field should not cause objectionable disturbance. To this end, it is desirable to secure the magnets 17 on shaft 2 so that the magnetic axis thereof is set at right angles to the direction of steepest slope of the disc.

Arranged around the inclined disc and rigidly secured to the casing and being coaxial with the moving structure is a stationary annular stator 6. This stator 6 may consist of stacked sheet metal laminations of sintered powder iron provided with a torical winding 7 having equal sections such as 8, 9, 10, connected in either star- or delta relation in the conventional fashion of polyphase windings.

Figure 4:
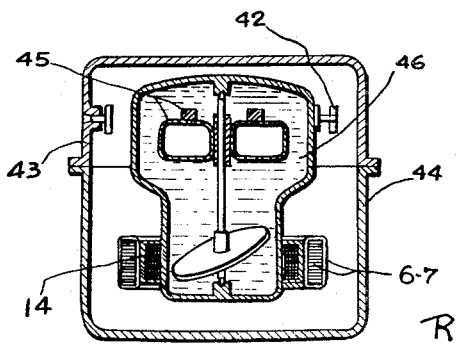
Fig. 4 shows one exemplary embodiment of an immersed compass having all the electric components thereof outside the binnacle.

The inner surface of this winding is spaced from the signal generated during the rotation of the inclined disc so that an annular air-gap is thus defined in which there is disposed a non magnetic member 15 provided with a cylindrical winding 14. An additional annular gap 16 may be provided to allow the necessary space for a wall of the sealed receptacle enclosing the moving structure in the case of a liquid-damped compass as shown in Figure 4. The central transverse planes of the torical and cylindrical windings 7 and 14 are coincident and extend through the centre of the inclined disc. The height of said windings is preferably at least equal to the overall axial length of the rotor. This arrangement allows the latter to cut across the greater part of the diametric magnetic flux.

Figure 2:
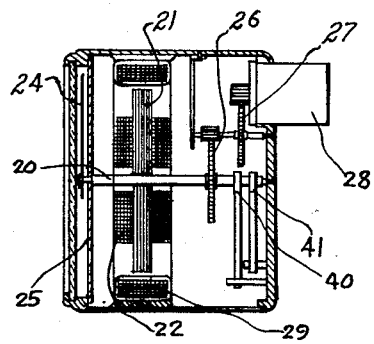
Fig. 2 illustrates in diagrammatical cross sectional elevation a repeater device remotely controlled from the transmitter.
Figure 3:
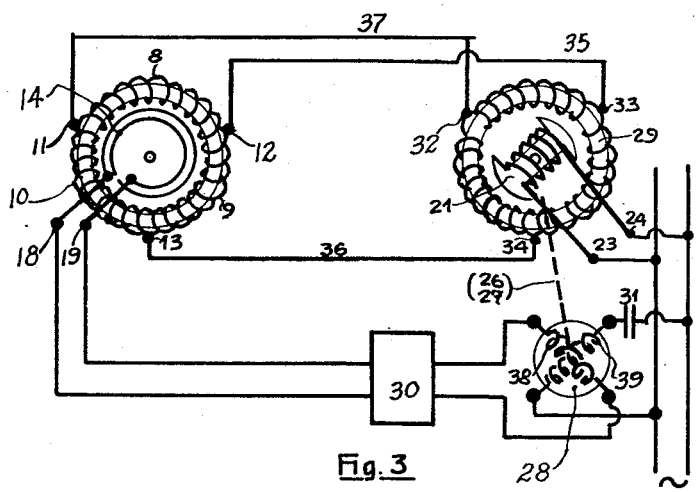
Fig. 3 is a diagrammatic showing of the wiring connections between the transmitter and the receiver.

Figs. 2 and 3 illustrate the construction of a receiver or repeater adapted for co-operation with the above described transmitter. The receiver essentially comprises a laminated rotor 21 constituting the inductor which carries a bi-polar winding 22 excited by a single-phase current through the conductors 23, 24, which may be supplied through slip-rings 40—41. This inductor rotor is supported by a shaft 20 to enable rotation thereof together with an indicating pointer 24 movable over a compass-card 25. The shaft 20 is adapted to be driven from the servo-motor 28 through speed-reduction gearing 26—27. Surrounding the rotor is an annular stator 29 provided with a torical winding similar to that of the transmitter.

Three output terminals 32, 33, 34 serve to connect the receiver stator by the wires 35, 36, 37 to the corresponding terminals 11, 12, 13 of the transmitter.

The above-described system operates as follows:

The inductor rotor 21 when energized, at all times generates a diametric alternating field within the receiver stator 29.

The electromotive forces induced by this field in the torical winding sections are transmitted over the connector wires to the corresponding sections of the transmitter stator, creating within the latter a diametric alternating field having a similar relative orientation.

The transmitter system can be assimilated to a pair of orthogonally disposed solenoids having intersecting axes, one being perpendicular to the axis of the movable magnetic system 17 and being variable in direction and equivalent to the torical inductor 7, and the other being axially directed and provided by the coil 14.

The mutual inductance coefficient of the two orthogonal solenoids, which obviously would be zero in the absence of the inclined disc, is essentially dependent upon the orientation of the disc and the oblique deflection of the field traversing it.

The mutual induction factor is at maximum when the axial component of the deflected field attains its maximum value, which occurs when the line of steepest slope of the disc 5 lies in the plane of the field induced in the transmitter stator. The induction then becomes zero as this line passes through a plane perpendicular to said field. This latter position of the disc 5 gives a zero signal condition within the coil 14, which corresponds to the stable position of the servo-motor, thereby controlling the position of the inductor rotor.

It will be noted that with this stable condition of the receiver there corresponds, within the transmitter, a position of the magnet assembly 17 in which the moments, due to the electromagnetic reactions of the single-phase field upon the inclined disc, are zero.

It will also be noted that for any other position, these disturbing couples always remain very low, for the following reasons:

(a) The current flowing through the detector coil 14 always remains negligibly low, as it is limited only to the amplifier input grid current.

(b) The fact that all the fixed and movable elements of the air-gap are revolving solids and are symmetrical. Also, the isotropic character of the air space containing the magnetic circuit minimizes the amplitude of variations in the total reluctance of this circuit, with variations in the angular position of the inclined disc.

A result of this absence of reactions is the possibility of transmitting the angular displacements of instruments having very low directional torques and which require a very high degree of accuracy without requiring exceptionally high standards of manufacturing tolerances.

The servo-control system using the signal detected by the coil 14 may be effected with the circuit shown in Fig. 3 in the following manner:

The coil 14 is connected with the variable phase 38 of an induction motor 28 through the medium of an amplifier 30, the fixed phase 39 of said motor being connected to the source of alternating current. A condenser 31 is provided for producing a 90° phase displacement between the phases 38 and 39.

Motor 28 is mechanically connected to rotor 21 through a speed reduction connection 26—27.

Fig. 4 illustrates, by way of example, one embodiment of the invention applied to a fluid compass utilizing the improved transmitter provided with a rotor of the inclined disc type.

In this improved compass, the wound torus 6, 7 and the coaxial detector coil 14 are arranged outside the sealed casing containing the float-structure 45 and body of liquid 46. The casing is made of non magnetic, non conductive material, its walls in the area concentric with the detector disc are sufficiently thin in order not to increase unnecessarily the size of the air gap separating the inclined disc from the torus. The sealed casing is pendulously suspended in a Cardan mounting by means of a ring 42 within the housing 43—44.

The above arrangement eliminates the limitations imposed by electrical connections and frictional contacts within a tank. The movable structure in the liquid is reduced merely to the normal elements of a two-pivot compass supporting the inclined disc.

The foregoing description relating to a remote-indicating compass is given merely for indicative purposes. The invention may be applied, using the same basic principles and structural elements as above described, to very widely varying electric remote transmission and indicating systems, especially those involving instruments developing very low directional torques.

I claim:

1. In a transmitter for a single phase alternating current synchronized servo remote control system applicable to instruments having a low driving torque, a rotating shaft, an elliptical disc formed of thin magnetically permeable material secured to the shaft in an inclined position, and an annular wound stator surrounding said disc and lying in a plane normal to the shaft and being radially spaced from said disc to define a cylindrical-like air space, the angle of inclination of said disc on said shaft being such that the relation of the contour of the disc is coincident with said cylindrical-like air space but of a slightly lesser radius whereby the axis of rotation of said disc is such that it is projected in plan as a circle whose center is on said rotating shaft and which is concentric with said stator, and detector means positioned in said air space between said disc and said stator.

2. In a transmitter for a single phase alternating current synchronized servo remote control system applicable to instruments having a very low driving torque, a rotating shaft and a disc formed of thin magnetically permeable material fixedly circumposed on the shaft and lying in a plane inclined to the axis of the shaft, an annular torically wound stator surrounding the disc and arranged in a plane normal to the shaft and spaced radially from the disc to provide an annular air space and a stationary coaxial detector coil arranged in the air space between the internal surface of the stator and the inclined disc.

3. In a transmitter for a single phase alternating current synchronized servo remote control system applicable to instruments having a very low driving torque, a rotating shaft and a disc formed of thin magnetically permeable material fixedly circumposed on the shaft and lying in a plane inclined to the axis of the shaft, an annular torically wound stator surrounding the disc and arranged in a plane normal to the shaft and spaced radially from the disc to provide an annular air space and a stationary coaxial detector coil arranged in the air space between the internal surface of the stator and the inclined disc, the center of said disc coinciding with the axis of the shaft.

4. A device as claimed in claim 2, wherein the stator consists of a stack of laminations of magnetically permeable sheet metal and is provided with a torical winding, the medial plane of which extends through the center of said inclined disc and which is at least equal in height to the diameter of the disc.

5. A device as claimed in claim 4, wherein the detector coil has an internal diameter greater than the cylindrical space swept by the inclined disc and is substantially equal in height to said torical winding.

References Cited in the file of this patent

UNITED STATES PATENTS

| | | |
|---|---|---|
| 1,431,627 | Bristol et al. | Oct. 10, 1922 |
| 2,439,094 | Miles | Apr. 6, 1948 |
| 2,484,022 | Esval | Oct. 11, 1949 |